Aug. 11, 1925.

S. HIRSHFIELD

PISTON RING

Filed July 5, 1924

1,548,948

INVENTOR
SIMON HIRSHFIELD
BY
ATTORNEY

Patented Aug. 11, 1925.

1,548,948

UNITED STATES PATENT OFFICE.

SIMON HIRSHFIELD, OF NEW YORK, N. Y.

PISTON RING.

Application filed July 5, 1924. Serial No. 724,195.

*To all whom it may concern:*

Be it known that I, SIMON HIRSHFIELD, a citizen of the United States of America, residing at New York city, county of Bronx, State of New York, have invented certain new and useful Improvements in Piston Rings, of which the following is a specification.

This invention relates to piston rings and in particular to a type having embedded therein an absorbent material.

An object of the invention is to provide a piston ring which will collect the excess oil on the walls of the cylinder and prevent the same from entering the combustion chamber.

A particular object of the invention is to provide a piston ring in which is embedded an oil absorbing wool composition or the like which will expand or swell to close any openings between the ring and the walls of the cylinder or between the ring and the top of the piston groove in which the ring is seated.

A further object is to so place the embedded composition that it will prevent any leakage of the oil around the piston ring grooves which would ultimately mix with the explosive compound to destroy the value of the same.

Referring to the drawing wherein I have shown a preferred embodiment of my invention, Figure 1 is a top plan view of a piston ring showing the method of applying in the upper side thereof my absorbent material, Figure 2 is a view of the ring in side elevation a part thereof being shown broken to disclose the filling in the upper side, the additional peripheral filling being fully shown.

Figure 1:
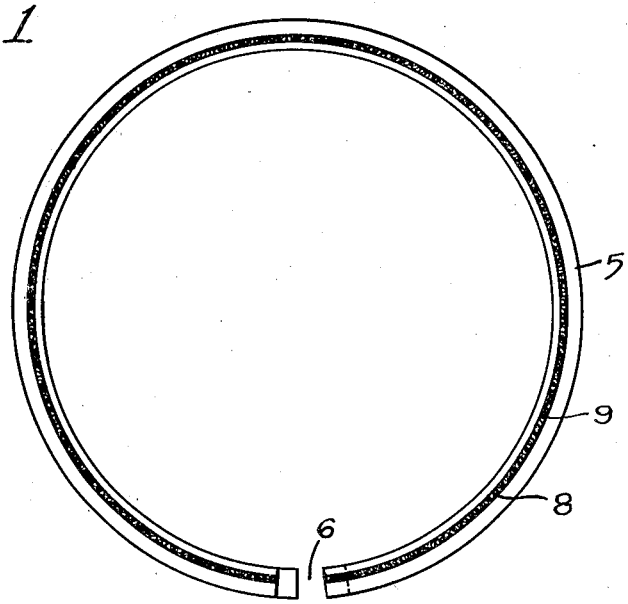
Figure 2:

Referring to the drawing in detail 5 indicates a piston ring of the type used generally in internal combustion engine pistons having the usual break 6 therein for the purpose of allowing the ring to spring open to keep in engagement with the wall of the cylinder.

Figure 3:
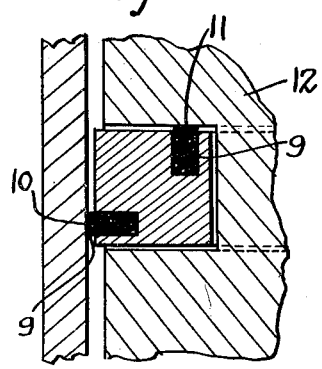
Figure 3 is a section taken through a portion of an engine cylinder piston and piston ring showing the absorbent material holding grooves in section.

During the constant rubbing of the piston rings against the wall of the cylinder wear occurs between the two at different points, and the lubricating oil seeps through into the combustion chamber and retards the efficient operation of the engine. In order to prevent the leakage of oil between the piston ring and piston or cylinder wall, I provide a groove 7 in the periphery of the piston ring 5 and a like groove 8 in the top of the ring. Into these grooves 7 and 8 I pack a filling 9 of absorbent wool composition or the like, which when saturated with oil will swell and protrude beyond the ring to engage the adjacent wall. In Figure 3 of the drawing these fillings 9 engage the cylinder wall as at 10 and the top of the piston ring groove 11 in the piston 12. This swelling action of the filler 9 prevents any passage of oil into the combustion chamber either between the ring and the wall of the cylinder, or around the ring.

Figure 4:
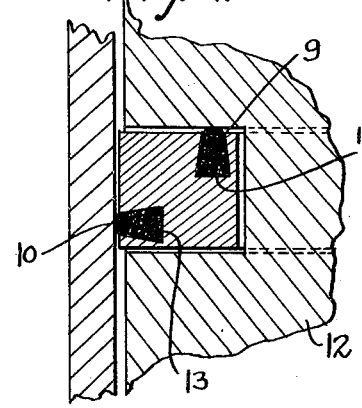
Figure 4 is a view similar to Figure 3 showing a different shape of groove in the piston ring which will retain the filler; and, Figure 5, is a view similar to Figure 3 showing a still further method of cutting a groove so that the filler will be held in place.
Figure 5:
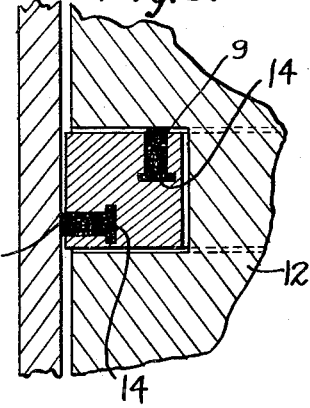

In order to guard against the filling falling out or working out of the grooves, I may form said grooves after the manner shown in Figures 4 and 5, that is, I may make the bottom of the groove wider than the top thereof as at 13, or I may provide a T-slotted groove 14.

The filling, however, will not be liable to fall out after it has once been saturated with oil and subjected to heat.

It will be particularly noted that the protruding filling will engage its opposite wall to prevent the passage of oil into the combustion chamber. The filling in the top of the ring swells and engages the top wall of the ring groove of the piston. This prevents seepage of oil behind the piston ring and over the top thereof.

It will be seen therefore that I have provided an improved piston ring in which is embedded a filling of absorbent material which will swell and take up the wear of the rings and prevent the lubricating oil from entering the combustion chamber.

Having described my invention, what I claim is:

1. A piston ring having a groove cut in the peripheral and side faces thereof, the bottoms of the grooves being wider than the tops, and an oil absorbent filler in said grooves adapted to swell and protrude beyond the surfaces of the ring.

2. A piston ring having a T-shaped groove cut in the periphery and in one side face thereof, and a filler of absorbent material in said grooves adapted to swell when saturated with oil, so that it will protrude beyond the surface of the ring.

SIMON HIRSHFIELD.